W. E. S. STRONG.
WATER HEATER.
APPLICATION FILED NOV. 10, 1919.
1,410,848. Patented Mar. 28, 1922.
2 SHEETS—SHEET 1.
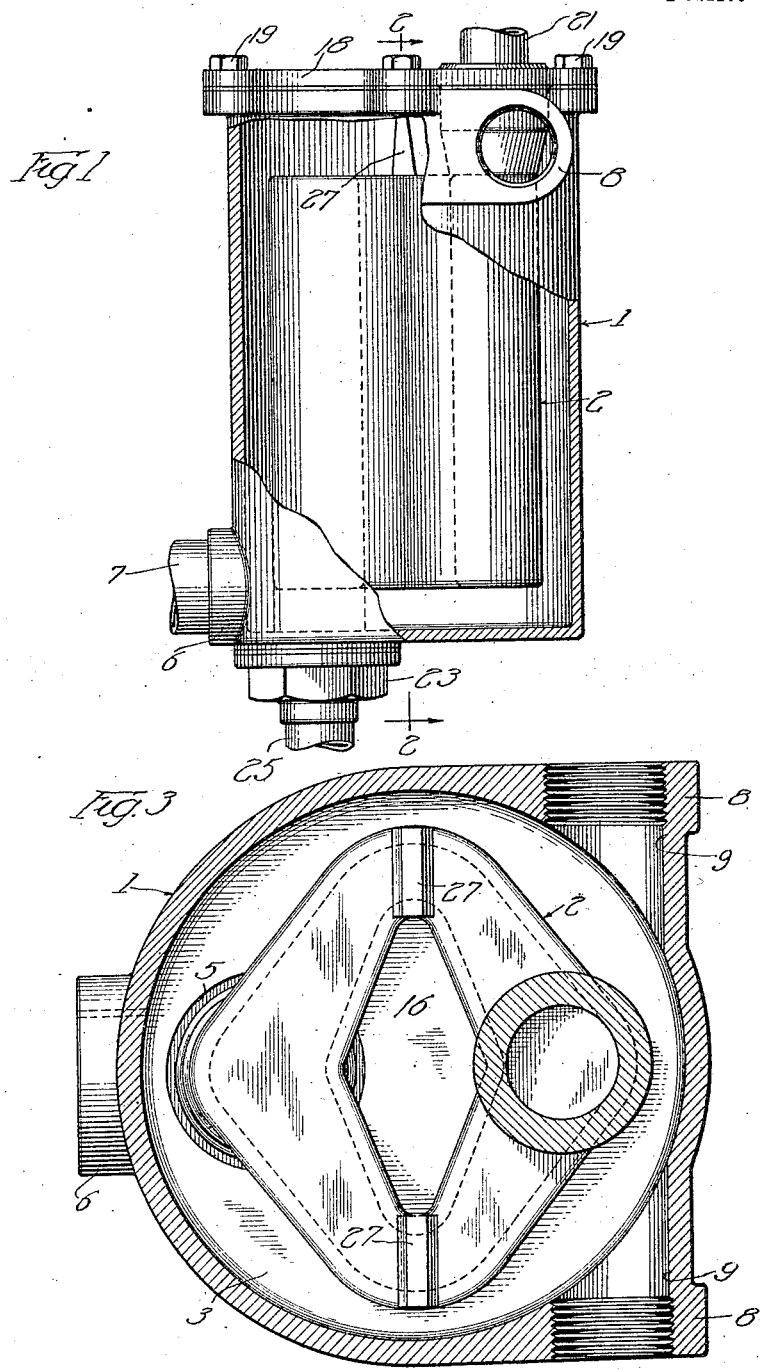

W. E. S. STRONG.
WATER HEATER.
APPLICATION FILED NOV. 10, 1919.
1,410,848.
Patented Mar. 28, 1922.
2 SHEETS—SHEET 2.
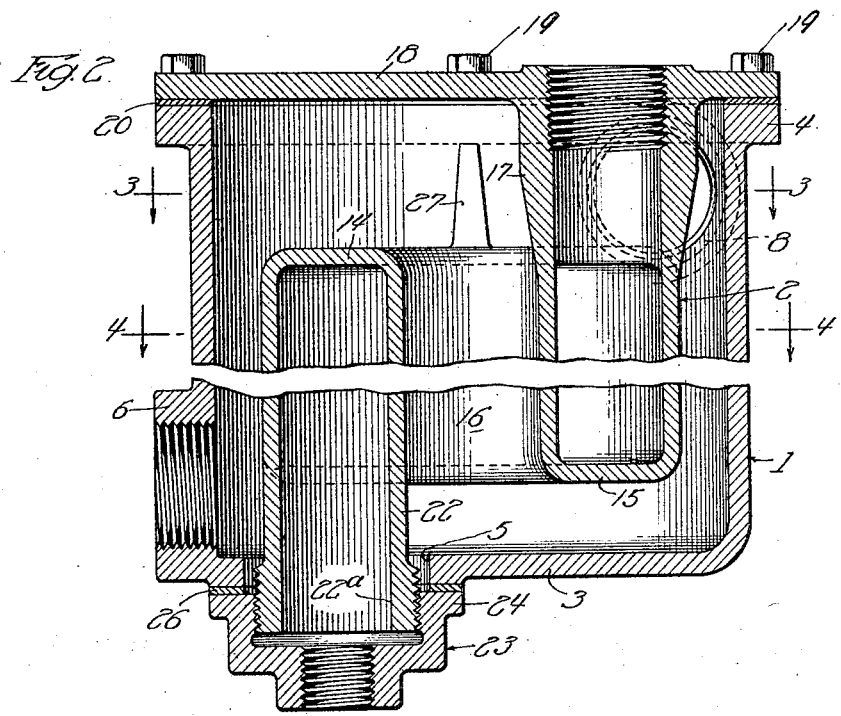
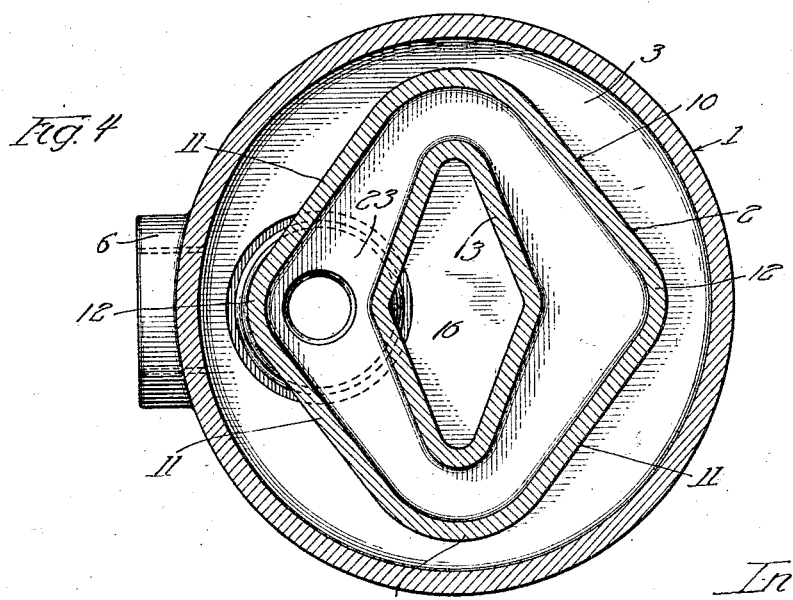

UNITED STATES PATENT OFFICE.

WILLIAM E. S. STRONG, OF NEW YORK, N. Y., ASSIGNOR, BY MESNE ASSIGNMENTS, TO THERMAL APPLIANCE COMPANY, INC., OF ELIZABETHPORT, NEW JERSEY, A CORPORATION OF NEW JERSEY.

WATER HEATER.

1,410,848.     Specification of Letters Patent.     Patented Mar. 28, 1922.

Application filed November 10, 1919. Serial No. 336,890.

*To all whom it may concern:*

Be it known that I, WILLIAM E. S. STRONG, a citizen of the United States, and a resident of New York, in the county of New York and State of New York, have invented certain new and useful Improvements in Water Heaters, of which the following is a specification.

This invention relates to improvements in water heaters, and more particularly to water heaters adapted for household or domestic use in which the hot water or steam from the heating plant is employed as a heating medium.

The object of the invention is to provide a simple and inexpensive type of heater and one that may be installed and maintained at a low cost. A further object of my invention is to simplify the construction and at the same time to design and arrange the parts so that maximum efficiency is secured.

The features of my invention are hereinafter fully set forth and illustrated in the accompanying drawings, in which—

Fig. 1 is a view in side elevation of the heater,

Fig. 2 is an enlarged view in vertical section taken on line 2, 2 of Fig. 1,

Fig. 3 is a cross-sectional view taken on line 3, 3 of Fig. 2, and

Fig. 4 is a similar cross-sectional view taken on line 4, 4 of Fig. 2.

A preferable form of a water heater embodying the features of my invention comprises in general an outer casing 1 of cylindric form and an inner shell or heating element 2 enclosed within the outer casing 1. Referring more in detail to the outer casing 1, the same is preferably constructed of cast metal such as iron, one end of the casing being provided with an integral end wall 3, the opposite end of the casing being open and surrounded by a marginal flange 4. Formed in the bottom wall 3 and preferably adjacent to the outer edge thereof is an annular opening 5 (Fig. 2) adapted to receive a part of the interior heating element 2 as will hereinafter be set forth. The casing 1 is further provided with a boss 6 preferably located near the lower edge of the cylindric side wall of the casing, said boss being provided with a threaded aperture adapted to receive a pipe 7 serving as a hot water or other heating medium inlet to the casing 1. Adjacent to the opposite or open end of the casing 1 are formed integral bosses 8, 8 located on opposite sides of the casing, there being formed in said bosses threaded openings 9, 9 communicating with the interior of the casing. These openings 9, 9, as shown in Fig. 3, are arranged in alinement with each other, the common axis of said openings bearing an approximate tangential relation to the contour of the cylindric casing. These connections 9 are adapted to receive a pipe connection serving as a discharge for the heating medium, the double form of connection being employed for convenience in installation, permitting either connection to be used depending on the arrangement of the piping employed. The connection not used may be permanently closed by means of a plug.

Referring to the construction of the heating element 2 enclosed within the casing 1, the same is a hollow cast metal shell preferably constructed in the following manner: An outer wall 10, having in cross section the general shape of a parallelogram, consists of straight wall sections 11 arranged at angles substantially forty-five degrees to each other, joined by curved intermediate sections 12. The outer wall 10 surrounds and is spaced from an inner wall 13 corresponding in its general conformation to the outer wall 10. The spaced walls 10 and 13 are joined at their ends by transverse end walls 14 and 15 thereby forming a closed space. The inner wall 13 forms a longitudinal passage 16 which is open at either end and extends throughout the length of the inner shell 2.

Integral with the inner shell 2, and communicating therewith through the end wall 14, which for the purpose of a clearer description may be designated as the upper end wall, is a short tubular connection 17 extending longitudinally from a point offset from the central axis of the shell 2. At its outer end the connection 17 is integral with a circular plate 18 adapted to cover and close the open end of the outer casing 1, there being employed a suitable number of cap screws 19 spaced around the edge of the plate and engaging holes formed in the flange 4. A gasket 20 of rubber or like material is interposed between the contacting surfaces of the plate 18 and the flange 4 of the casing 1. The entrance of the tubular connection or opening through the plate 18 is threaded to receive a discharge pipe 21 (Fig. 1) of the inner shell. At the opposite or lower end of the shell 2 is a similar tubular extension or connection 22 located on the opposite side of the shell, and extending endwise from the lower end wall 15. This connection is adapted to register with the opening 5 in the adjacent end wall 8 of the outer casing 1 and is provided with an externally threaded end portion 22$^a$ projecting through said opening 5. An internally threaded collar 23 has screw threaded engagement with the threaded end 22 of the connection 21, said collar having a bearing flange 24 engaging around the margin of the opening 5 and a threaded aperture to receive an inlet pipe 25 (Fig. 1.) A gasket 26 is placed between the contacting surfaces of the flange 24 and casing 1, and serves to form a water-tight joint, and also to compensate for the longitudinal expansion of the inner shell relative to the outer casing 1. Obviously the gasket 20 at the opposite end of the casing serves the same purposes. By reason of this construction, the inner heating element is fixed at its opposite ends to the casing, the cover plate serving two functions, namely, as a closure for the open end of the casing and as an integral supporting member for the heating element. Cast integral with the end wall 14 of the heating element 2 on opposite sides of the longitudinal passage 16 thereof are two baffles 27, 27 adapted to control the circulation of the water around the inner shell 2, as will hereinafter be fully set forth.

Referring more in detail to the structure and conformation of the inner shell, the outer and inner walls 10 and 13 respectively, have the general shape of parallelograms in cross-sectional contour, as heretofore indicated, the outer wall having the straight side portions 11 joined by rounded corner portions 12. The inner wall 13 corresponds generally in sectional contour to the outer wall though slightly elongated in one direction with the result that the space between the walls is divided into two similarly shaped passages on opposite sides of a vertical plane including the major axis of the inner wall 13, as shown in Fig. 4. These passages, by reason of the unsymmetrical relation of the walls 10 and 13, converge toward two of the diagonally opposed corners of the shell, and diverge toward the other similarly opposed corners. This particular conformation is calculated to promote the efficiency of the device, in that the maximum effective heating or radiating surface is obtained by the formation of the central passage 16 and the diversion of the water into two relatively thin streams through the narrow passages exposed on all sides to the heating medium circulating around the shell, as well as lengthwise through the central passage 16.

The parallelogram conformation is to be preferred as, for instance, over a cylindric form, especially where the heater is installed in a horizontal position rather than, as in the vertical position shown, it being manifest that the device is readily adapted for use in either position. Assuming that the heater is installed in a horizontal position, the water to be heated enters the inner shell from the lower level (which is proper inasmuch as the tendency of heated water is to rise) the same will be divided at the lower portion of the shell and pass upwardly through the passages and thence to the discharge connection at the upper level. The substantially straight formation of the passages presents a surface offering less resistance to the flow of the water than would a cylindric or curved passage in which the direction of flow is generally tangential to the passage, and therefore greater resistance to the flow of water is present. Manifestly the installation of the heater in vertical position is theoretically the more efficient, but by reason of the conformation of the inner shell, the efficiency of the heater in horizontal position is made to approach that of the vertical position, and it is thus possible to secure the same degree of efficiency in either position of installation.

The simplicity of construction of the device is readily appreciated as it consists of only three members, all of simple structure and easily assembled, the casing being a cylindric cast vessel having an open end with one end wall an integral part of the casing. The heating element having the cover or closure plate integral therewith affords a simple and effective method of supporting the inner heating element within the casing. Similarly, a single collar member connecting the inlet pipe of the inner heating element and the opposite end wall forms a tight joint and provides for the relative expansion and contraction between the parts, without leakage. The assembly of the device is a very simple operation, involving only the placing of the heating element within the casing so that the inlet connection 22 of the inner shell registers with the opening 5 in the bottom wall, the applying of the collar 23 on the end thereof, and finally the placing of the cap screws 19 through the cover plate to fasten the same in place.

In connecting up the heater with a source of water supply the water to be heated would obviously be admitted at the lowermost connection 25 of the inner shell, and discharged from the upper connection 21, Fig. 1. The heating water, or other heating medium, would be connected in reverse order with the outer casing, namely, entering at the upper connection 8 and being discharged from the lower connection 7, Fig. 1. In the case where the heater is installed in horizontal position, the baffles 27 act to prevent the heating water from following the course of least resistance or directly from point of inlet to discharge, around the exterior surface of the shell, and acts to break up the current of water tending to flow in that course, causing it to circulate through the central passages 16 through the heating element 2.

Obviously, in a device constructed as herein set forth the functions of the outer casing and inner shell may be reversed, that is, the heating medium may be circulated through the inner shell and the water to be heated through the outer casing. In every case the proper pipe connections would be made with the external sources of supply.

For the reasons stated, I do not wish to be limited to the exact structure or mode of employment described and illustrated except in so far as the invention is specifically set forth in the appended claims.

I claim as my invention:

1. A heating device comprising a casing provided with inlet and discharge connections, a heating element enclosed within said casing and embracing inlet and discharge connections extending through openings formed in said casing, and closures for said openings fixed to said connections of the heating element.

2. A heating device comprising a casing provided with inlet and discharge connections and with openings at opposite ends thereof, a heating element enclosed within said casing and comprising integral inlet and discharge connections, closure members for said openings provided with passages communicating with said connections of the heating element, one of said closure members being integral with its associated connection.

3. A heating device comprising a casing open at one end and provided with inlet and discharge connections, a heating element mounted within said casing and provided with integral inlet and discharge connections, one of said connections extending through an aperture in the adjacent wall of said casing, a collar having threaded engagement with said connection exterior said casing, and a closure plate for said open end of the casing integral with the other connection of said heating element.

4. A water heater comprising a casing provided with inlet and discharge connections, a heating element mounted in said casing and comprising inner and outer spaced walls having the general shape of parallelograms in cross-sectional contour and forming two relatively narrow interior passages and a longitudinal exterior passage, and integral inlet and discharge connections supported in the wall of said casing.

5. A water heater comprising a casing open at one end and having an integral end wall at the other end, inlet and discharge connections communicating with said casing, a heating element enclosed in said casing comprising outer and inner spaced walls having the general shape of parallelograms in cross-sectional contour and forming a longitudinal central passage therethrough, and integral inlet and discharge connections, one of said connections extending through an aperture in the wall of said casing, and a collar mounted on the end thereof exterior of said casing, and a cover plate detachably secured over the open end of said casing and integral with the other connection of said heating element.

6. A water heater comprising a casing having inlet and discharge connections, a heating element mounted within said casing and consisting of spaced inner and outer walls having the general shape of parallelograms in cross-sectional contour, and relatively disposed to divide the interior space into two relatively narrow passages, said heating element being provided with inlet and discharge connections communicating exterior said casing.

7. A water heater comprising a casing having inlet and discharge connections at opposite ends thereof, a heating element mounted within said casing and comprising spaced walls forming two relatively narrow inner passages, and a longitudinal central exterior passage, inlet and discharge connections supported in the wall of said casing and integral with said heating element, the same being provided with integral exterior baffles located adjacent the longitudinal passage thereof and the inlet connection of said casing.

In witness whereof, I hereunto subscribe my name this 5th day of November, A. D. 1919.

WILLIAM E. S. STRONG.